Sept. 2, 1969  J. W. CRANE ET AL  3,464,345
HAY BALER
Filed May 26, 1967  3 Sheets-Sheet 3

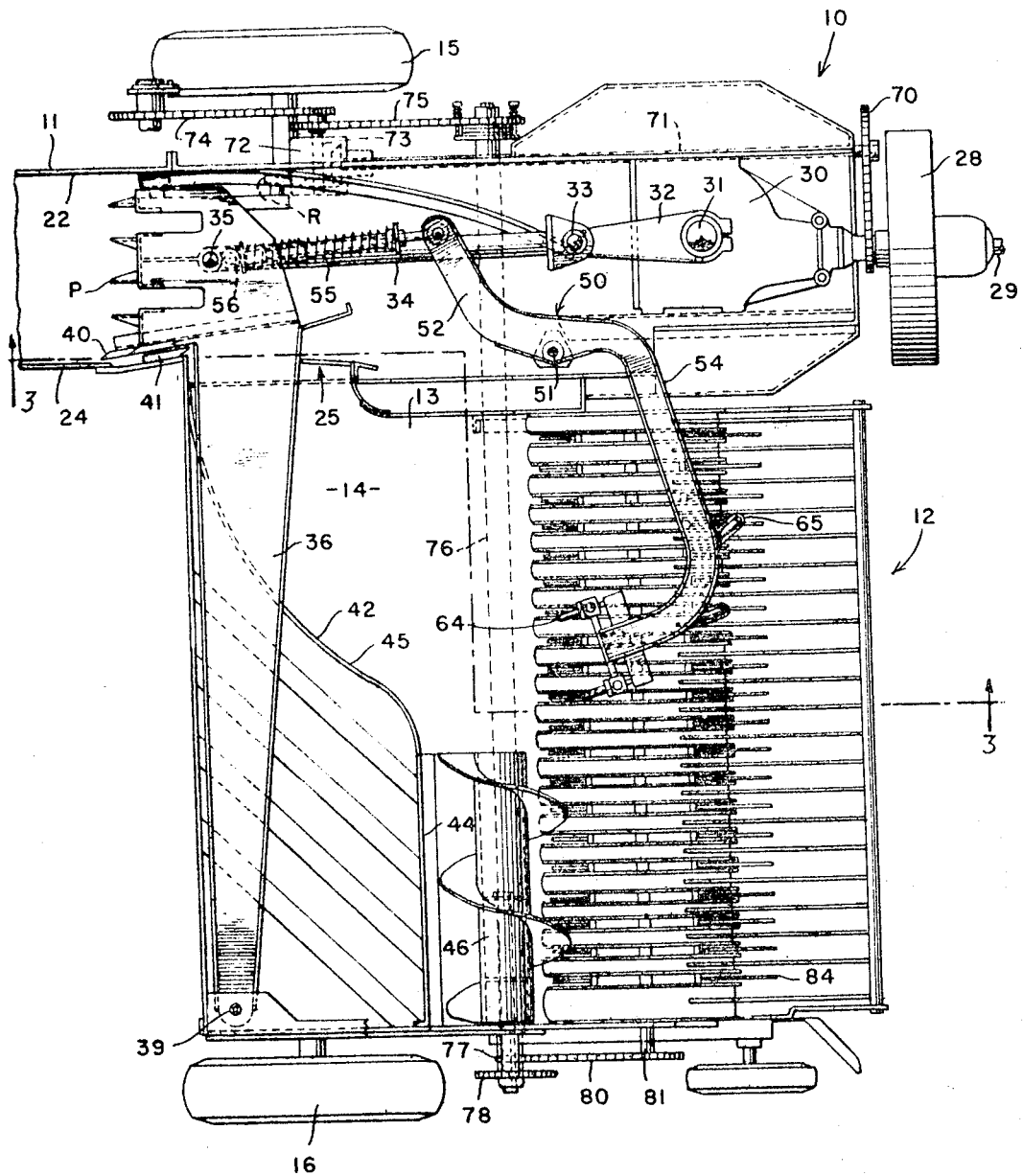

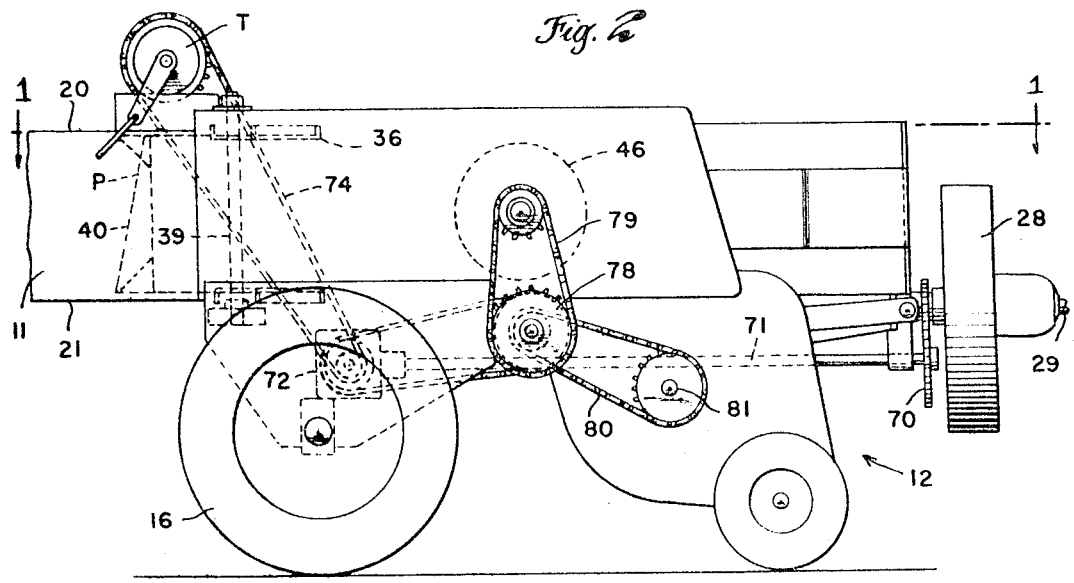
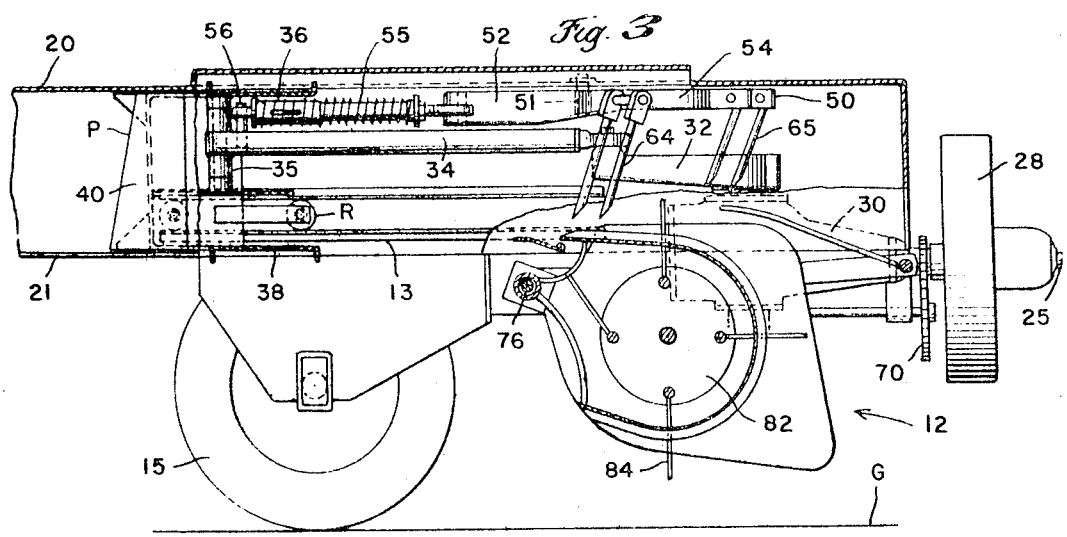
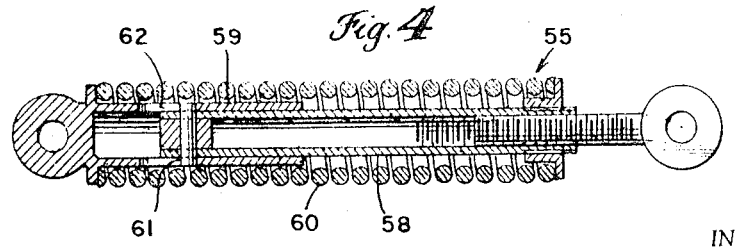

INVENTORS
JACK W. CRANE
& EDWIN B. NOLT
BY *Joseph A. Brown*
ATTORNEY

United States Patent Office 3,464,345
Patented Sept. 2, 1969

3,464,345
HAY BALER
Jack W. Crane and Edwin B. Nolt, New Holland, Pa., assignors to Sperry Rand Corporation, New Holland, Pa., a corporation of Delaware
Filed May 26, 1967, Ser. No. 641,553
Int. Cl. A01f 15/02; B30b 1/06, 9/30
U.S. Cl. 100—142     10 Claims

ABSTRACT OF THE DISCLOSURE

A hay baler having a bale case in which a plunger oscillates in an arc about a vertical axis and wherein the feeder which delivers material into the bale case also travels in an arc about a vertical axis and opposite to the oscillations of the plunger, the drive to both the plunger and the feeder operating in a horizontal plane.

Background of invention

In a conventional hay baler, the bale case extends horizontally in a fore-and-aft direction relative to ground travel. The bale case has a feed opening in a side wall thereof and hay is fed into the bale case between reciprocating strokes of a bale forming plunger. Conventionally, the plunger travels in a straight line at about sixty to seventy strokes per minute and the forces which drive the plunger are in a vertical plane.

In some balers, reciprocating feeders are employed which operate in time with the baler plunger. Because of the inertia forces which develop when reciprocating means is employed, there are limits in the speed at which the baler may be operated.

Summary of the invention

One object of this invention is to provide a hay baler in which the plunger is so constructed and supported that it may be properly operated at substantially higher speeds than the plungers of conventional balers.

Another object of this invention is to provide with a plunger of the character described a feeder which is directly coupled to the plunger to operate therewith.

Another object of this invention is to provide a baler of the character described in which both the plunger and the feeder are oscillated by a crank arm and connecting rod which move in a horizontal plane about vertical axes thereby mimimizing the forces to which the plunger is subjected and enabling light weight construc- of the plunger.

Another object of this invention is to provide a baler of the character described in which a plunger has a faster operating stroke than is conventional and also a shorter stroke whereby better bale length control is achieved and there is more control of the final bale because of the increased number of wads which make up the bale.

A still further object of this invention is to provide a baler feeder which passes between support members of the plunger in feeding hay into a bale case.

Other objects of this invention will be apparent hereinafter from the specification and from the recital in the appended claims.

Brief description of the drawings

FIG. 1 is a plan section of a hay baler having a plunger and a feeder constructed according to this invention, such section being taken approximately on the line 1—1 of FIG. 2 looking in the direction of the arrows and showing the plunger at the end of a working stroke and the feeder retracted;

FIG. 2 is a side elevation of FIG. 1 looking from the right side of the baler relative to its forward travel;

Figure 5:
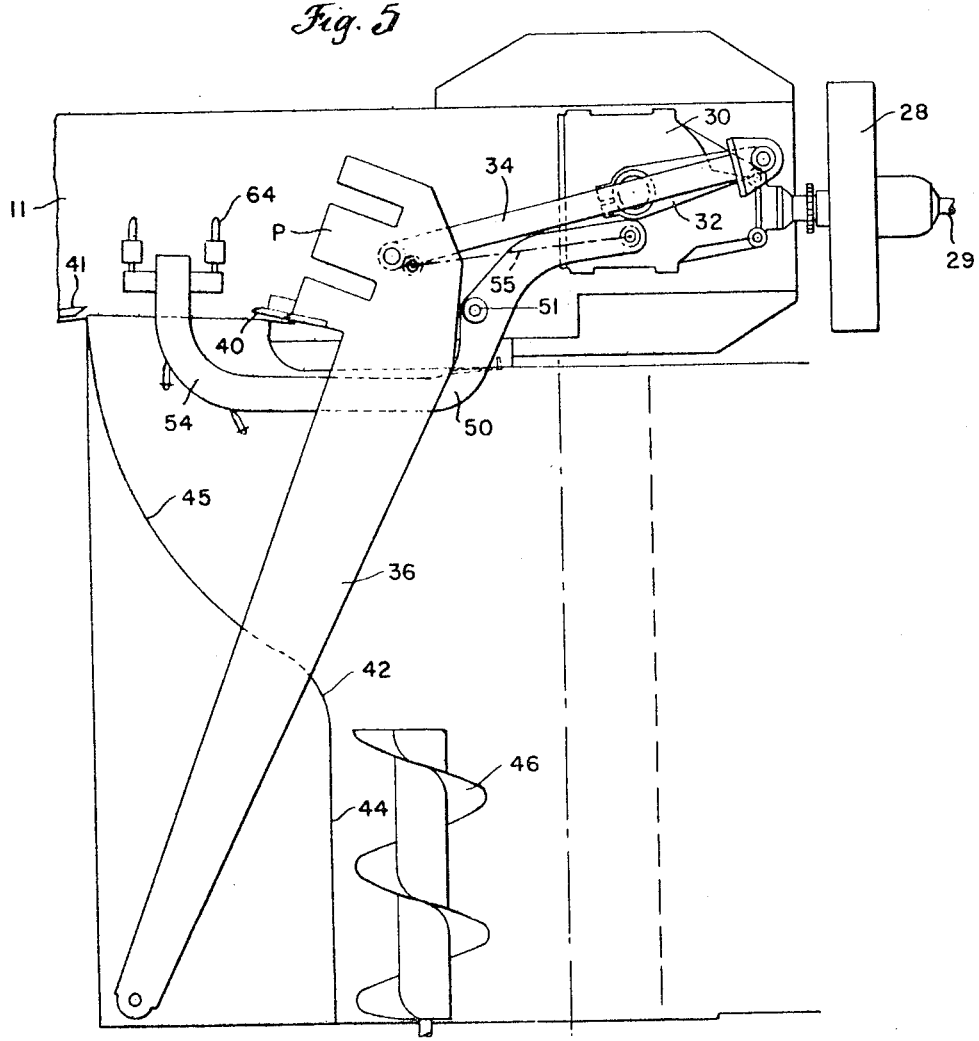
Figure 6:
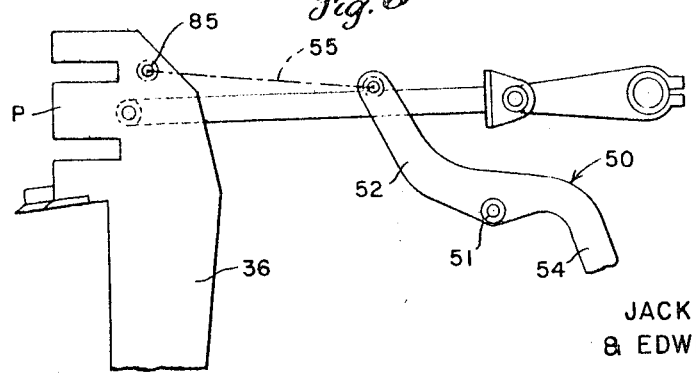

FIG. is a longitudinal vertical section taken generally on the line 3—3 of FIG. 1 looking in the direction of the arrows and with a portion of the plunger broken away to show the connection of the drive rod to the plunger;

FIG. 4 is an enlarged vertical section of the link connection between the feeder and the drive therefor;

FIG. 5 is a diagrammatic view similar to FIG. 1 showing the plunger retracted and the feeder at the end of a delivery stroke; and FIG. 6 shows an alternate connection of the feeder to the plunger to drive the feeder off of the plunger.

Description of preferred embodiment

Referring now to the drawings by numerals of reference, and particularly to FIGS. 1–3, 10 denotes generally a hay baler having a fore-and-aft horizontally extending bale case 11, a conventional transversely extending pickup 12, an infeed chamber 14 having a platform or bottom 13, and a pair of laterally spaced ground wheels 15 and 16. Bale case 11 has t top wall 20, a bottom wall 21 and vertical side walls 22 and 24. Side wall 24 has an infeed opening 25 through which hay is delivered to bale case 11 from feed chamber 14.

At its forward end, bale case 11 carries a flywheel 28 which receives power through a connection 29 to the tractor, not shown, which tows baler 10 over the ground G toward the right of FIGS. 1–3. Power is transmitted rearwardly from the flywheel to a gearbox 30 supported on the bale case and having a vertically extending output shaft 31 to which a crank arm 32 is connected. Crank arm 32 rotates above gearbox 30 in a horizontal plane about the vertical axis of shaft 31 and it is pivotally connected at pivot pin 33 to connecting rod 34. At its rearward end connecting rod 34 is pivotally connected by a vertical axis wrist pin 35 to a relatively light weight plunger P.

The baler plunger P is formed from and carried on a pair of horizontally extending vertically spaced legs, namely upper leg 36 and lower leg. 38. The ends of the legs remote from plunger P are pivotally connected to a vertical pin 39 at a location substantially spaced from side wall 24 of the bale case and behind the outboard end of the pickup 12. The plunger P oscillates on an arc and in a horizontal plane about the axis of pivot pin 39. The plunger has a vertical knife 40 which cooperates with a vertical stationary shear bar 41 fixedly connected to bale case side wall 24 adjacent the rearward edge of infeed opening 25. In its oscillations, the plunger P is supported on rollers R which merely have to carry the weight of the plunger, not guide it. The path of travel of plunger P is dictated by the fixed vertical axis of pivot pin 39.

Rearwardly of pickup 12, an upright feeder wall 42 is provided having a forward portion 44 which exteands perpendicular to the line of travel of the baler and curves laterallly and rearwardly through a curved section 45 to a terminal point adjacent shear bar 41. In front of wall portion 44 is an auger 46 which operates behind the outboard end of the pickup and this auger operates to deliver hay toward bale case 11 and feed chamber 14.

Pivotally mounted on bale case 11 is a feeder arm 50. The pivot arm 51 for arm 50 has a vertical axis and the arm has a section 52 on one side of the pivot pin and another section 54 on the opposite side. Arm section 52 is connected by link 55 to the connecting rod 34. This connection is by means of a pin 56 shown best in FIG. 3. The construction of link 55 is shown in detail in FIG. 4. It comprises telescopic members 58 and 59 yieldably forced apart by a compression spring 60. Such movement is limited by a pin 61 carried on member 58 and projecting into a slot 62 in member 59. Any shortening of the link length is against the compression force of the spring.

At the terminal end of feeder arm section 54, there are two sets of pivotally mounted feed fingers namely front set 64 and rear set 65. These fingers are conventionally mounted to extend in a rigid erect position when travelling toward bale case 11 and to pivot in a clockwise direction from the position shown in FIG. 3 when the fingers are being withdrawn away from the bale case. The fingers travel from the retracted position shown in FIGS. 1 and 3 to the extended position as shown in FIG. 5 between each compression stroke of the plunger P. When in extended position the fingers are adjacent infeed opening 25 in the bale case.

Interposed between flywheel 28 and gearbox 30 is a chain 70 which drives a fore-and-aft extending shaft 71. Shaft 71 terminates in a rearward gearbox 72 having an output shaft 73 which drives a chain 74 to the tying mechanism of the baler indicated generally at T in FIG. 2. It also drives a chain 75 to a cross shaft 76 which extends to the outboard end of the baler to drive a sprocket 78 connected by a chain 79 to drive the auger 46 and to a sprocket 77 connected by a downwardly and forwardly extending chain 80 to the shaft 81 of the reel 82 of pickup 12. Reel 82 has crop engaging tines 84 which sweep in a counterclockwise direction when viewed as shown in FIG. 3.

In the operation of the baler described, the tines 84 of pickup 12 engage crop material on the ground G and elevate the material for discharge rearwardly. The portion of the crop material toward the bale case 11 is deposited directly into chamber 14. Any hay coming up the right hand side or outboard end of the pickup is delivered to the auger 46 which conveys the hay inwardly and into the path of the front fingers 64 on the feeder.

When the crank arm 32 rotates about the drive shaft 31, it operates through the connecting rod 34 to oscillate plunger P. The plunger swings from a retracted position as shown in FIG. 5 to an extended position as shown in FIG. 1. The plunger head travels in an arc about the axis of the pivot pin 39 and on each working or rearward stroke of the plunger, the knife 44 on the plunger head moves in shearing relation to the stationary knife 41 on the bale case. Therefore, hay delivered into the bale case is separated into separate wads. As the plunger oscillates, the feeder arm 50 oscillates in timed relation with it and the feed fingers 64–65 on section 54 sweep from the forward position shown in FIG. 1 to a delivery or discharge position as shown in FIG. 5 wherein the front fingers 64 project into bale case 11.

It will be noted that all of the forces driving the plunger operate in a horizontal plane. The crank arm 32 travels in a horizontal plane about the axis of the shaft 31 and the connecting rod 34 also moves in a horizontal plane. As a result, the plunger P is subjected to no vertical plane forces tending to cock the plunger. Also, the plunger is constrained to travel in a given path established by the axis of the pivot pin 39 whereby horizontal forces are resisted. The plunger design is thus enabled to be of relatively light weight and the baler may be operated at relatively high speeds such as ninety to one hundred and ten strokes per minute.

The design described, provides a close coupled relationship, between the plunger and the baler feeder. During each working and return stroke, arm 54 and the fingers thereon travel between the legs 36 and 38 which carry the plunger P. As shown in FIG. 5, when the feed fingers are at the end of a working stroke, arm 54 is between the support legs of the plunger. Also, it will be noted that lower plunger leg 38 is beneath the platform 13 of chamber 14 whereby the sweeping of hay toward the bale case is unobstructed. When the plunger next moves on a working stroke and the feeder retracts, the close relationship between the plunger head and the fingers enables a clean transfer of the hay from the feeder to the plunger. This produces desirable characteristics in the delivery of hay into the bales to be formed.

Another characteristic of the arrangement provided is that when plunger P is approaching the end of a working stroke, crank arm 32 and connecting rod 34 are approaching a straight line position. There is generally a straight rearward force which provides a very effective shear between plunger knife 40 and shear bar 41 and a properly directed force relative to forming the bales. Also, the geometry of the design is such that the feeder has a slower forward infeed and a quicker return stroke. This is desirable because the feeder gently handles the hay as it is travelling toward the bale case but moves quickly away from opening 25 on a return stroke to gather the next charge of hay to be moved toward the baler.

In FIGS. 1 and 3, link 55 between feeder arm 50 and plunger P is shown to be connected to the pin 56 on the connecting rod 34. If desired, however, link 55 can be connected directly to the plunger head as diagrammatically shown in FIG. 6. This would merely require a pivot pin 85 offset to a position free of the path of travel of rod 34.

Having thus described our invention, what we claim is:

1. A hay baler comprising a mobile frame, a bale case on said frame extending in a horizontal direction and having a feed opening in a side wall thereof, a hay receiving chamber on said frame alongside said bale case into which hay is deposited, said chamber communicating with said opening, a plunger in said bale case and movable back and forth across said opening to compress hay into bales, a vertically extending pivot pin on said baler spaced from the side of said bale case toward said chamber, a pair of horizontally extending vertically spaced legs having adjacent ends connected to said pivot pin and opposite ends connected to said plunger, drive means for oscillating said plunger, said plunger travelling in an arc about the axis of said pin and in a horizontal plane, and means operable between said pair of legs for feeding hay across said chamber, through said opening and into said bale case.

2. A hay baler as recited in claim 1 wherein said feeder comprises feed fingers, an arm which carries said fingers, and a vertical pivot along said bale case establishing a point about which said fingers travel in an arc, the arc of travel fingers being opposite to the arc of travel of said plunger.

3. A hay baler as recited in claim 2 wherein said arm is medially pivoted, said fingers being connected to the arm on one side of the pivot, and means connecting the opposite side of said arm to said plunger whereby when the plunger is oscillated the feeder is simultaneously oscillated in time therewith.

4. A hay baler as recited in claim 3 wherein said means connecting said arm to said plunger includes a spring which allows the feeding of crop material by said fingers to be arrested when an overload condition is encountered.

5. A hay baler as recited in claim 2 wherein said baler has an auger mounted to convey crop material into the path of travel of said feed fingers.

6. A hay baler as recited in claim 1 wherein said means for oscillating said plunger comprises a gearbox, a crank arm driven from said gearbox and which swings in a horizontal plane about a vertical axis, and a connecting rod having one end pivotally attached to said crank arm and an opposite end pivotally attached to said plunger, both of said pivotal attachments allowing pivoting about vertical axes.

7. A hay baler as recited in claim 6 wherein said feeder comprises fingers carried on an arm pivotal on a vertical axis adjacent said bale case, and means connecting said arm to said connecting rod whereby when the plunger is oscillated said feed fingers are simultaneously oscillated.

8. A hay baler comprising a mobile frame adapted to travel forwardly, a fore-and-aft bale case on said frame and extending in a horizontal direction, said bale case having a feed opening in a side wall thereof, a hay receiving platform projecting laterally from said feed opening adjacent the bottom thereof, a housing forming a crop material chamber above said platform into which hay is deposited, said chamber being opened forwardly and communicataing with said bale case opening, a plunger in said bale case and movable back and forth across said opening to compress hay into bales, a vertically extending pivot pin on said baler spaced from said bale case opening on the side toward said chamber, a pair of horizontally extending vertically spaced legs having adjacent ends connected to said pivot pin and opposite ends connected to said plunger, a gearbox on the forward end of said bale case and having an upwardly extending output shaft, a crank arm on said shaft and rotatable in a horizontal plane about the vertically extending axis of the shaft, a connecting rod having one end pivotally connected to said crank arm and an opposite end pivotally connected to said plunger, both pivotal connections of said connecting rod allowing pivoting about a vertical axis, said plunger being oscillated in an arc by said connecting rod and about the axis of said pin, an arm medially pivoted on said bale case for sweeping movement in a horizontal plane, feed fingers on one end of said arm engageable with crop on said platform and in said chamber, means connecting an opposite end of said arm to said plunger to oscillate the arm, said fingers travelling between said pair of legs from a retracted position forwardly of said chamber to an extended position adjacent said bale case opening, and means pivotally supporting said fingers for extension in a vertical direction when moving toward said bale case and an inclined position when moving away from said bale case.

9. A hay baler as recited in claim 8 wherein said baler frame carries an auger which conveys hay toward said bale case and into the path of travel of said feed fingers.

10. A hay baler comprising a horizontally extending bale case having an infeed opening in a side wall thereof, a plunger, means supporting said plunger for swinging movement in an arc about a vertical axis, a feeder, means supporting said feeder for swinging movement in an arc about a vertical axis with the arc of movement between said plunger and the plunger vertical axis, and drive means movable in a horizontal plane for driving said plunger and said feeder.

References Cited

UNITED STATES PATENTS

| 3,134,321 | 5/1964 | Loehnert | 100—98 |
| 3,174,425 | 3/1965 | Eby et al. | 100—142 XR |
| 3,220,171 | 11/1965 | Hadler | 100—189 XR |

FOREIGN PATENTS

| 1,308,417 | 9/1962 | France. |
| 801,589 | 1/1951 | Germany. |

PETER FELDMAN, Primary Examiner

U.S. Cl. X.R.

100—98, 189